United States Patent
Yoon

(10) Patent No.: US 12,094,134 B2
(45) Date of Patent: Sep. 17, 2024

(54) ELECTRONIC DEVICE AND METHOD FOR TRACKING OBJECT THEREOF

(71) Applicants: HYUNDAI MOTOR COMPANY, Seoul (KR); KIA CORPORATION, Seoul (KR)

(72) Inventor: Young Chul Yoon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 441 days.

(21) Appl. No.: 17/675,304

(22) Filed: Feb. 18, 2022

(65) Prior Publication Data

US 2023/0041382 A1  Feb. 9, 2023

(30) Foreign Application Priority Data

Aug. 4, 2021 (KR) .................. 10-2021-0102736

(51) Int. Cl.
*G06T 7/277* (2017.01)
*G06T 3/60* (2006.01)
(Continued)

(52) U.S. Cl.
CPC ............ *G06T 7/277* (2017.01); *G06T 3/60* (2013.01); *G06T 7/70* (2017.01); *G06V 10/74* (2022.01); *G06T 2207/10028* (2013.01)

(58) Field of Classification Search
CPC ............ G06T 7/277; G06T 3/60; G06T 7/70; G06T 2207/10028; G06T 7/55;
(Continued)

(56) References Cited

U.S. PATENT DOCUMENTS 8,379,014 B2  2/2013  Wiedemann et al.
9,277,122 B1  3/2016  Imura et al.
(Continued)

FOREIGN PATENT DOCUMENTS

EP   3796131 A1 * 3/2021 ............ A63F 13/211
KR   10-0343780 B1   7/2002
(Continued)

OTHER PUBLICATIONS

Davison et al., "MonoSLAM: Real-Time Single Camera SLAM," in IEEE Transactions on Pattern Analysis and Machine Intelligence, vol. 29, No. 6, pp. 1052-1067, Jun. 2007, doi:10.1109/TPAMI.2007.1049.
(Continued)

*Primary Examiner* — Neil R McLean
(74) *Attorney, Agent, or Firm* — MCDONNELL BOEHNEN HULBERT & BERGHOFF LLP

(57) ABSTRACT

An electronic device and a method for tracking an object thereof are provided. The electronic device identifies whether there is a first object being tracked, when obtaining an image and rotation information of a camera of the electronic device, corrects state information of the first object using the rotation information, when there is the first object, detects a second object matched to the first object from the image based on the corrected state information, and tracks a position of the second object using an object tracking algorithm.

20 Claims, 11 Drawing Sheets

(51) Int. Cl.
*G06T 7/70* (2017.01)
*G06V 10/74* (2022.01)

(58) Field of Classification Search
CPC ........... G06T 2207/10016; G06T 2207/30196; G06T 3/06; G06T 5/00; G06T 7/223; G06T 7/50; G06T 7/62; G06T 7/66; G06V 10/74; G06V 2201/08; G06V 10/761; G06V 20/52; G06V 40/103; G06V 10/24
USPC ........................................................ 382/103
See application file for complete search history.

(56) References Cited

U.S. PATENT DOCUMENTS

| 10,567,657 | B2 | 2/2020 | Zhang | |
|---|---|---|---|---|
| 11,006,048 | B2 | 5/2021 | Yun et al. | |
| 2006/0238549 | A1* | 10/2006 | Marks | G06F 3/0304 345/633 |
| 2010/0208941 | A1 | 8/2010 | Broaddus et al. | |
| 2019/0342501 | A1 | 11/2019 | Yun et al. | |
| 2020/0342613 | A1* | 10/2020 | Altuev | H04N 23/62 |
| 2021/0350145 | A1 | 11/2021 | Park et al. | |

FOREIGN PATENT DOCUMENTS

| KR | 10-0544677 B1 | 1/2006 |
|---|---|---|
| KR | 10-1156547 B1 | 6/2012 |
| KR | 10-1275297 B1 | 6/2013 |
| KR | 10-1364046 B1 | 2/2014 |
| KR | 2018-0046543 A | 5/2018 |
| KR | 2019-0069957 A | 6/2019 |
| KR | 2020-0044182 A | 4/2020 |
| KR | 10-2121287 B1 | 6/2020 |

OTHER PUBLICATIONS

Yoon et al., "Bayesian Multi-object Tracking Using Motion Context from Multiple Objects. Proceedings"—2015 IEEE Winter Conference on Applications of Computer Vision, WACV 2015. 33-40. 10.1109/WACV.2015.12.
Yoon et al., "Online Multi-object Tracking via Structural Constraint Event Aggregation" 1392-1400. 10.1109/CVPR.2016.155.

* cited by examiner

ELECTRONIC DEVICE AND METHOD FOR TRACKING OBJECT THEREOF

CROSS REFERENCE TO RELATED APPLICATIONS

This application claims the benefit of priority to Korean Patent Application No. 10-2021-0102736, filed in the Korean Intellectual Property Office on Aug. 4, 2021, the entire contents of which are incorporated herein by reference.

TECHNICAL FIELD

The present disclosure relates to an electronic device and a method tracking an object thereof.

BACKGROUND

An object tracking technology is a technology of detecting an object (e.g., a person, a vehicle, and/or the like) from an image (or a video) captured by a camera and tracking a change in position of the detected object. As object tracking schemes, there are a scheme using a single camera, a scheme using a multi-camera, a scheme using feature matching between two frames, and the like.

Because the scheme using the single camera tracks an object position using a two-dimensional (2D) object tracking algorithm on the assumption that the camera is fixed, it is difficult to accurately model motion of the object because there is a change in object position on a 2D image in a situation where the camera moves. The scheme using the multi-camera may accurately detect a position of the object on a three-dimensional (3D) space, but it is difficult to track an object position on the 3D space in a situation where the image capture position is not fixed. As the rotation of the camera is rapidly generated, when blur and/or a rolling shutter effect are/is generated, it is difficult to extract a feature, and there is a high possibility that feature matching will fail in the scheme using the feature matching between the two frames. Furthermore, because it takes a lot of time for feature extraction and feature matching, it is difficult for the scheme to be applied in real time.

As such, because the existing scheme assumes that only motion of the object occurs, it may normally operate in a situation where the camera is fixed. However, when motion of the camera occurs, positions of objects which appear on the image are influenced by motion of the camera as well as motion of the object and it fails to track the object.

SUMMARY

The present disclosure has been made to solve the above-mentioned problems occurring in the prior art while advantages achieved by the prior art are maintained intact.

An aspect of the present disclosure provides an electronic device for correcting a position of an object using rotation information of a camera to enhance tracking performance and a method for tracking an object thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for tracking an object in an electronic device may include identifying whether there is a first object being tracked, when obtaining an image and rotation information of a camera of the electronic device, correcting state information of the first object using the rotation information, when there is the first object, detecting a second object matched to the first object from the image based on the corrected state information, and tracking the second object using an object tracking algorithm.

The correcting of the state information of the first object may include identifying whether the first object has a class with high noise with reference to a lookup table, determining to apply a first correction algorithm, when the first object has the class with the high noise, and determining to apply a second correction algorithm, when the first object does not have the class with the high noise.

The correcting of the state information of the first object may include calculating a difference value between a previous rotation matrix and a current rotation matrix of the camera, projecting a center point of the first object onto a three-dimensional (3D) space using a calibration matrix and previous depth information, performing rotation correction of the center point of the first object projected onto the 3D space based on the calculated difference value, projecting the rotation corrected center point of the first object onto a two-dimensional (2D) image using the calibration matrix and current depth information, and updating previous state information of the first object to state information of the first object projected onto the 2D image.

The correcting of the state information of the first object may include calculating a difference value between a previous rotation matrix and a current rotation matrix of the camera, projecting each of three points of a bounding box of the first object onto a 3D space using a calibration matrix and previous depth information, performing rotation correction of each of the three points projected onto the 3D space based on the calculated difference value, projecting each of the rotation corrected three points onto a 2D image using the calibration matrix and current depth information, and updating state information of the first object based on a bounding box projected onto the 2D image.

The state information may include center point coordinates, a width, and a height of an object bounding box.

The object tracking algorithm may be at least one of a Kalman filter, an extended Kalman filter, a particle filter, or a linear motion model.

The identifying of whether there is the first object may include receiving the image and depth information from the camera and receiving the rotation information of the camera from a detector of the electronic device.

The detecting of the second object matched to the first object may include calculating intersection over union (IoU) or Euclidean distance between the first object and the second object and performing matching between the first object and the second object using a data association algorithm based on the calculated IoU or the calculated Euclidean distance.

The detecting of the second object matched to the first object may further include ending tracking of the first object and determining the second object as a new object, when there is no second object matched to the first object.

The tracking of the second object may include estimating depth information using prior information about a size of the second object, when there is no depth information and tracking the second object based on the estimated depth information.

According to another aspect of the present disclosure, an electronic device may include a camera that obtains an image, a detector that detects rotation information of the camera, and a processor connected with the camera and the detector. The processor may identify whether there is a first object being tracked, when obtaining the image and the rotation information of the camera, may correct state information of the first object using the rotation information, when there is the first object, may detect a second object matched to the first object from the image based on the corrected state information, and may track a position of the second object using an object tracking algorithm.

The processor may identify whether the first object has a class with high noise with reference to a lookup, may determine to apply a first correction algorithm, when the first object has the class with the high noise, may determine to apply a second correction algorithm, when the first object does not have the class with the high noise.

The processor may calculate a difference value between a previous rotation matrix and a current rotation matrix of the camera, may project a center point of the first object onto a three-dimensional (3D) space using a calibration matrix and previous depth, may perform rotation correction of the center point of the first object projected onto the 3D space based on the calculated difference value, may project the rotation corrected center point of the first object onto a two-dimensional (2D) image using the calibration matrix and current depth information, and may update previous state information of the first object to state information of the first object projected onto the 2D image.

The processor may calculate a difference value between a previous rotation matrix and a current rotation matrix of the camera, may project each of three points of a bounding box of the first object onto a 3D space using a calibration matrix and previous depth information, may perform rotation correction of each of the three points projected onto the 3D space based on the calculated difference value, may project each of the rotation corrected three points onto a 2D image using the calibration matrix and current depth information, and may update state information of the first object based on a bounding box projected onto the 2D image.

The state information may include center point coordinates, a width, and a height of an object bounding box.

The object tracking algorithm may be at least one of a Kalman filter, an extended Kalman filter, a particle filter, or a linear motion model.

The processor may receive the rotation information from a rotation controller that controls a rotation operation of the camera.

The processor may calculate intersection over union (IoU) or Euclidean distance between the first object and the second object and may perform matching between the first object and the second object using a data association algorithm based on the calculated IoU or the calculated Euclidean distance.

The processor may end tracking of the first object and may determine the second object as a new object, when there is no the second object matched to the first object.

The processor may estimate depth information using prior information about a size of the second object, when there is no depth information and may track the second object based on the estimated depth information.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
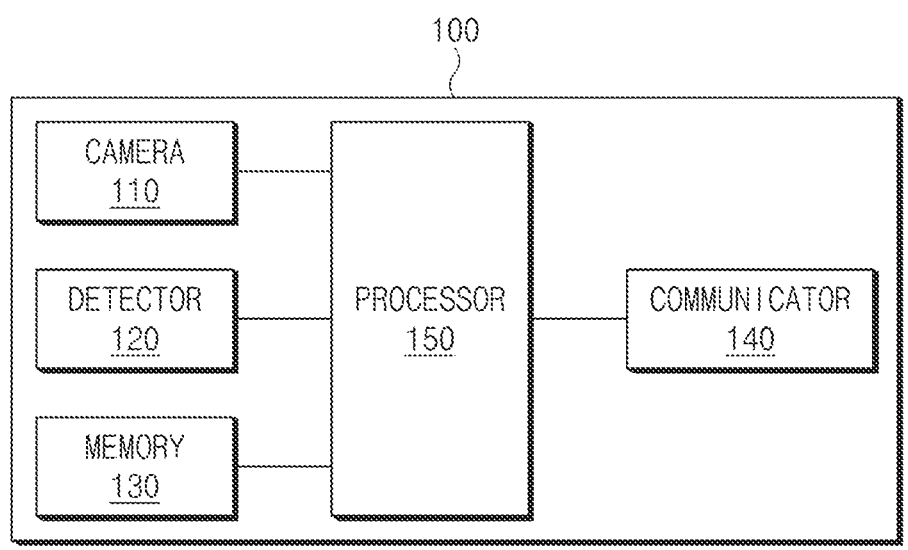
FIG. 1 is a block diagram illustrating a configuration of an electronic device according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an electronic device according to embodiments of the present disclosure.

An electronic device 100 may be a device such as a robot, a wearable device, and/or a handheld device (e.g., a tablet, a smartphone, and the like). Such an electronic device 100 may include a camera 110, a detector 120, a memory 130, a communicator 140, and a processor 150.

The camera 110 may capture an image (or a video). The camera 110 may include at least one of image sensors such as a charge coupled device (CCD) image sensor, a complementary metal oxide semi-conductor (CMOS) image sensor, a charge priming device (CPD) image sensor, and a charge injection device (CID) image sensor. The camera 110 may include an image processor for performing image processing, such as noise cancellation, color reproduction, file compression, image quality adjustment, and saturation adjustment, for an image obtained (acquired) by the image sensor. Furthermore, the camera 110 may include a depth sensor which measures a depth (or distance) from the camera 110 to an object using a measurement scheme such as time of flight (TOF).

The camera 110 may be rotatably installed by using an axis of any one direction (e.g., a y-axis) as a rotation axis (a reference axis). Although not illustrated in the drawing, the electronic device 100 may include a drive device (e.g., a motor or the like) for rotating the camera 110 with respect to the rotation axis, a rotation controller for controlling an operation of the drive device to control a rotational direction and the amount of rotation (a rotational angle) of the camera 110, and the like. Herein, the rotation controller may directly deliver rotation information of the camera 110 to the processor 150.

The detector 120 may detect rotation information of the camera 110. A position relationship between the detector 120 and the camera 110 may be fixed. The detector 120 may include at least one of sensors such as an inertial measurement unit (IMU), an acceleration sensor, an angular velocity sensor, and/or a geomagnetic sensor. The detector 120 may deliver the detected rotation information to the processor 150 and/or the rotation controller.

The memory 130 may store a first correction algorithm, a second correction algorithm, an object tracking algorithm, and the like. The memory 130 may store an image and depth information obtained by the camera 110 and rotation information or the like detected by the detector 120. The memory 130 may store a lookup table in which a noise class for each object type is defined. The noise class for each object type may be preset by a developer.

The memory 130 may be a non-transitory storage medium which stores instructions executed by the processor 150. The memory 130 may include as at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), an embedded multimedia card (eMMC) and/or a universal flash storage (UFS).

The communicator 140 may assist in performing wired communication and/or wireless communication with an external device and/or an external system. The wired communication may be implemented as at least one of communication technologies such as a local area network (LAN), a wide area network (WAN), an Ethernet, and/or an integrated services digital network (ISDN). The wireless communication may be implemented as at least one of a wireless Internet technology, such as wireless LAN (WLAN) (Wi-Fi), wireless broadband (Wibro), and/or world interoperability for microwave access (WiMAX), a short range wireless communication technology, such as Bluetooth, near field communication (NFC), and/or radio frequency identification (RFID), a mobile communication technology, such as code division multiple access (CDMA), global system for mobile communication (GSM), long term evolution (LTE), LTE-Advanced, and/or international mobile telecommunication (IMT)-2020, and/or a global navigation satellite system (GNSS) communication technology.

The processor 150 may control the overall operation of the electronic device 100. The processor 150 may include as at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

The processor 150 may detect at least one first object from the image received from the camera 110. The processor 150 may track a change in position of the at least one first object using an object detection algorithm. When rotation of the camera 110 occurs while tracking the at least one object, the processor 150 may recognize the rotation of the camera 110 by means of the detector 120.

After the rotation of the camera 110 occurs, the processor 150 may receive sensing information, that is, an image, depth information, rotation information, and/or the like. The processor 150 may receive an image and depth information from the camera 110. Furthermore, the processor 150 may receive rotation information of the camera 110 from the detector 120.

The processor 150 may identify whether there is an object which is being tracked previously, that is, the first object. When there is the first object being tracked, the processor 150 may determine whether the first object has a class with high noise with reference to the lookup table stored in the memory 130. When the first object has the class with the high noise, the processor 150 may determine to apply the first correction algorithm. When the first object has a class with low noise, the processor 150 may determine to apply the second correction algorithm. The processor 150 may correct state information of the first object using the determined correction algorithm. The state information may include center coordinates (x, y), a width (w), a height (h), and the like of a bounding box (bbox) of an object.

The processor 150 may detect at least one second object from the image after correcting the state information. In the present embodiment, detecting the at least one second object from the new image obtained by the camera 110 after correcting the state information of the first object is described as an example, but not limited thereto. The processor 150 may detect the at least one second object from the image immediately after receiving the image from the camera 110.

The processor 150 may identify whether there is depth information about the second object. When there is the depth information about the second object, the processor 150 may use the depth information. When there is no depth information about the second object, the processor 150 may estimate depth information based on prior information (e.g., an average size or the like) associated with the second object.

The processor 150 may track a position of the object being tracked, using the object tracking algorithm based on depth information which is previously present or the estimated depth information. The processor 150 may track the second object matched to the first object based on the corrected state information of the first object.

When there is no first object which is being tracked previously, the processor 150 may detect a new second object from the image. The processor 150 may identify whether there is depth information of the detected second object. When there is no depth information of the detected second object, the processor 150 may estimate depth information. The processor 150 may track the second object using the object tracking algorithm based on the depth information which is present or the estimated depth information.

The processor 150 may transmit the tracked result to the external device and/or the external system using the communicator 140. The external device or the external system may provide a service using the tracked result.

Figure 2:
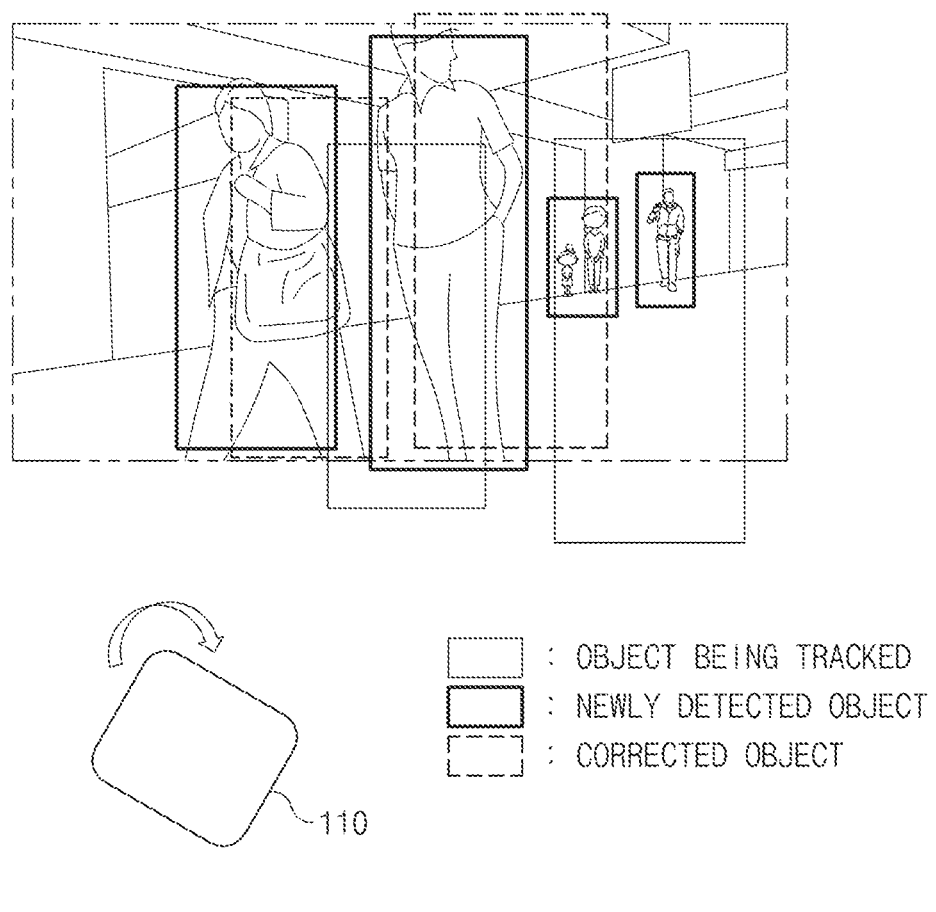
FIG. 2 is a drawing illustrating a correction scenario according to embodiments of the present disclosure.

FIG. 2 is a drawing illustrating a correction scenario according to embodiments of the present disclosure.

Referring to FIG. 2, when rotation of a camera 110 of FIG. 1 occurs in a situation where there is state information of an object which is being tracked previously, an electronic device 100 of FIG. 1 may receive an image obtained after the rotation from the camera 110. The electronic device 100 may detect a new object from the received image. A position of the newly detected object may be very far away from a position of the object which is previously tracked due to rotation. The electronic device 100 may correct state information of the object being tracked based on rotation information of the camera 110. The electronic device 100 may match the object being tracked with the newly detected object in a situation there is rapid rotation by correcting the state information of the object being tracked.

FIGS. 3A to 3D are drawings illustrating a method for correcting a position of an object according to an embodiment of the present disclosure.

The present disclosure describes a process of performing position correction of an object with high noise (e.g., a person or the like). Herein, an electronic device 100 of FIG. 1 may correct a center point position of an object using a first correction algorithm. The center point position (a center position) of the object may be defined as center point coordinates (center coordinates) of a bounding box of the object.

Figure 3A:
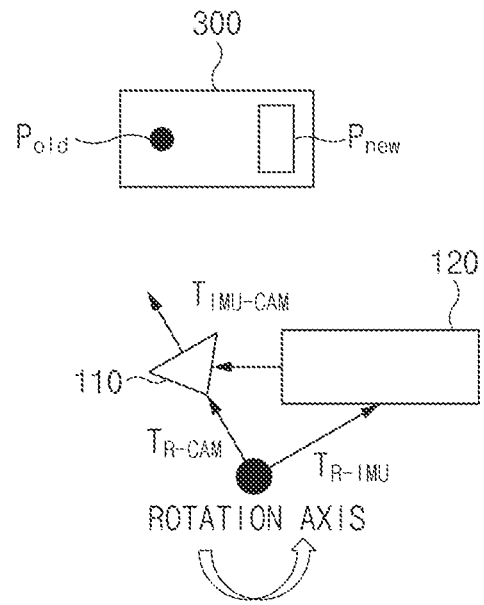
FIGS. 3A, 3B, 3C, and 3D are drawings illustrating a method for correcting a position of an object according to an embodiment of the present disclosure.

Referring to FIG. 3A, when rotation of a camera 110 occurs while tracking a 2D object from an image 300 obtained by the camera 110, a position of the object in the image 300 may change from $P_{old}$ to $P_{new}$. At this time, a processor 150 of the electronic device 100 may obtain rotation information of the camera 110 by means of a detector 120. The processor 150 may calculate a difference value $R_{dif}$ between a current rotation matrix $R_t$ and a previous rotation matrix $R_{t-1}$ with respect to the camera 110. The difference value $R_{dif}$ between the two rotation matrices may be represented as Equation 1 below.

$$R_{dif} = R_t \cdot R_{t-1}^{-1} \qquad \text{Equation 1:}$$

Figure 3B:
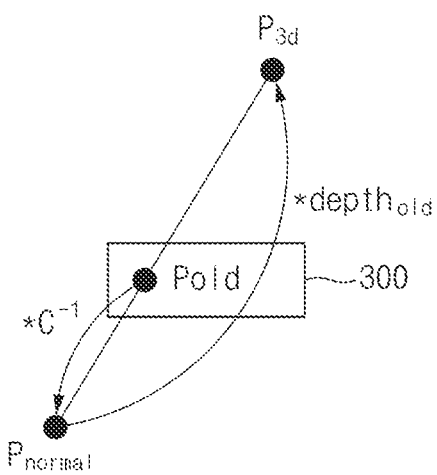

Referring to FIG. 3B, the processor 150 may project a center position $P_{old} = (x_{old}, y_{old})$ of $bbox_{old} = (x_{old}, y_{old}, w_{old}, h_{old})$ of an object being tracked onto a normalized image coordinate system using a calibration matrix C and onto a 3D space, that is, a camera coordinate system using previous depth information $depth_{old}$. The center position $P_{3d}$ of the object projected onto the 3D space may be represented as Equation 2 below.

$$P_{3d} = depth_{old} \cdot C^{-1} \cdot [x_{old}, y_{old}, 1]^T \qquad \text{Equation 2:}$$

Figure 3C:
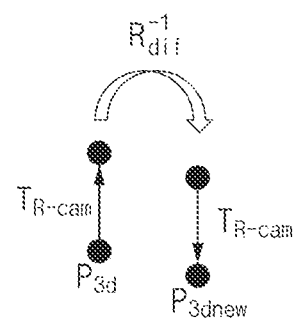

According to FIG. 3C, the processor 150 may correct the center position $P_{3d}$ of the object projected onto the 3D space using rotation information. The processor 150 may move $P_{3d}$ by a distance $T_{R\text{-}cam}$ between the camera 110 and a rotation axis, may perform rotation correction ($R_{dif}^{-1}$) of the moved $P_{3d}$, and may restore the corrected $P_{3d}$ to an original position again ($-T_{R\text{-}cam}$). The corrected object position $P_{3dnew}$ may be represented as Equation 3 below.

$$P_{3dnew} = R_{dif}^{-1} \cdot (P_{3d} + T_{R\text{-}cam}) - T_{R\text{-}cam} \qquad \text{Equation 3:}$$

A z-axis of $P_{3dnew}$ may be new depth $depth_{new}$.

Figure 3D:
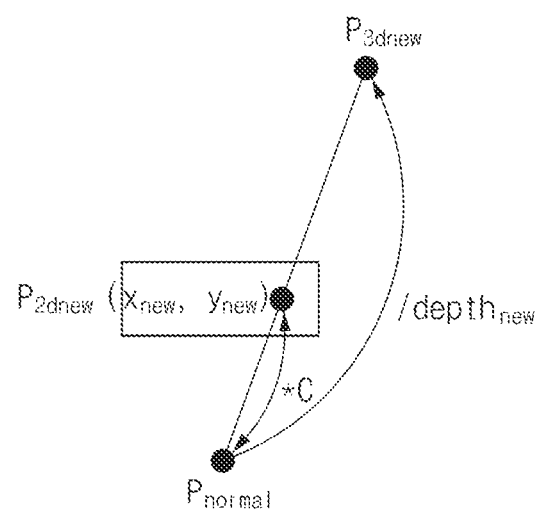

According to FIG. 3D, the processor 150 may project the corrected 3D object position $P_{3dnew}$ onto a 2D image again. The object position $P_{2dnew}$ projected onto the 2D image may be represented as Equation 4 below.

$$P_{2dnew} = C \cdot (P_{3dnew} / depth_{new}) \qquad \text{Equation 4:}$$

The processor 150 may generate a new object bounding box $bbox_{new} = [x_{new}, y_{new}, w_{old}, h_{old}]$ using coordinates of $P_{2dnew}$ and previous depth information $depth_{old}$ on a 2D image coordinate system. The processor 150 may update tracking information of the object using $bbox_{new}$ and $depth_{new}$.

The processor 150 may execute rotation correction of all objects being tracked. When the rotation correction of all the objects is completed, the processor 150 may execute existing 2D object tracking. When noise of the detected bbox is high, the processor 150 may fail to correct a width and a height of the detected bbox.

FIGS. 4A to 4D are drawings illustrating a method for correcting a position of a second object according to another embodiment of the present disclosure.

The present disclosure describes a process of performing position correction of an object with low noise (e.g., a face or the like). Herein, an electronic device 100 of FIG. 1 may correct a width and a height of a bbox of an object as well as a center position of the bbox of the box using a second correction algorithm.

Figure 4A:
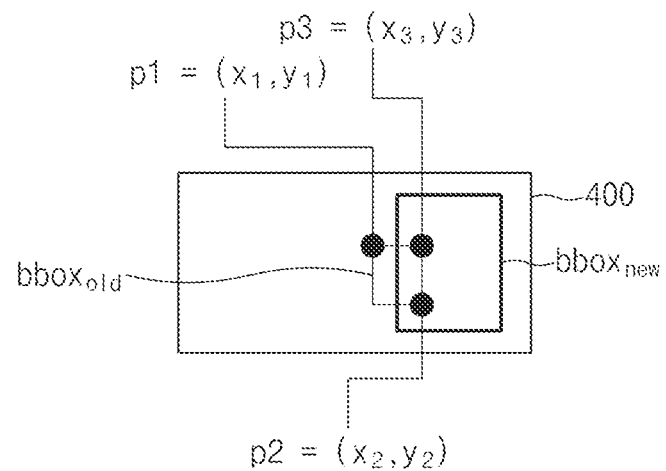
FIGS. 4A, 4B, 4C, and 4D are drawings illustrating a method for correcting a position of a second object according to another embodiment of the present disclosure.

Referring to FIG. 4A, there may occur a difference between a center position and a size of an object bounding box $bbox_{new}$ in an image 400 after a camera rotates and a center position and a size of an object bounding box $bbox_{old}$ in the image 400 before the camera rotates. The second correction algorithm may correct a position of an object using three of four points of the object bounding box bbox.

Figure 4B:
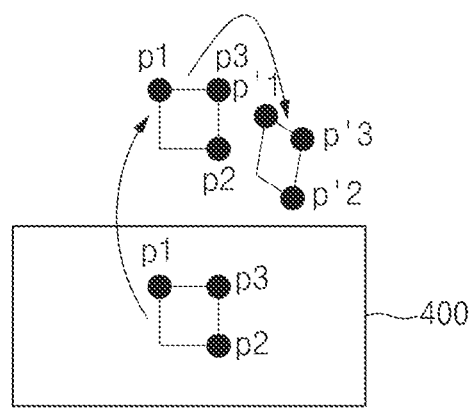

A processor 150 of FIG. 1 may detect positions of three points p1, p2, and p3 of an object bounding box $bbox_{old}$ which is tracked before the camera rotates. The processor 150 may execute rotation correction of each of the three points p1, p2, and p3. As shown in FIG. 4B, the processor 150 may project each of the points p1, p2, and p3 onto a 3D space and may perform rotation correction of each of the points p1, p2, and p3 projected onto the 3D space.

Figure 4C:
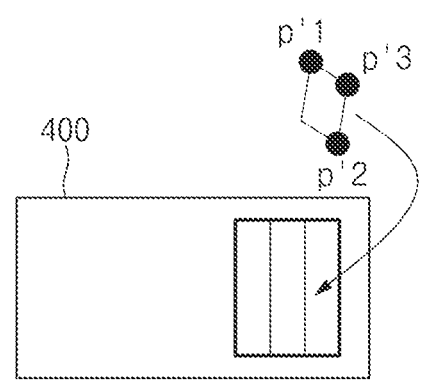

Referring to FIG. 4C, when the rotation corrected $bbox_{old}$ is immediately reprojected onto a 2D image, distortion may occur due to $bbox_{old}$ rotation with respect to a plurality of axes.

Figure 4D:
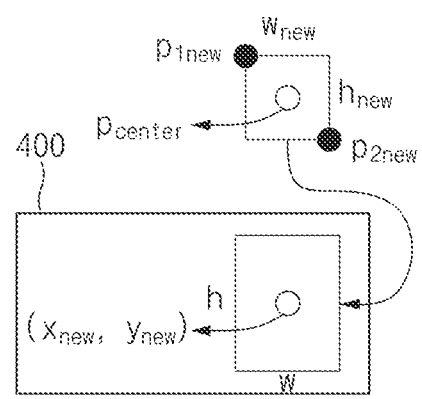

Thus, as shown in FIG. 4D, the processor 150 may generate a new $bbox_{new}$ based on three points p'1, p'2, and p'3 of the rotation corrected $bbox_{old}$. The processor 150 may calculate a center position $p_{center}$, a width $w_{new}$, and a height $h_{new}$ of the new $bbox_{new}$ using Equations 5 to 7 below.

$$p_{center} = (p'_1 + p'_2)/2 \qquad \text{Equation 5:}$$

$$w_{new} = \|p'_1 - p'_3\|_2 \qquad \text{Equation 6:}$$

$$h_{new} = \|p'_2 - p'_3\|_2 \qquad \text{Equation 7:}$$

The processor 150 may generate a left-top point $p_{1new}$ and a right-bottom point $p_{2new}$ of the new $bbox_{new}$. The left-top point $p_{1new}$ and the right-bottom point may be represented as Equation 8 and Equation 9.

$$p_{1new} = p_{center} - \left(\frac{w_{new}}{2}, \frac{h_{new}}{2}, 0\right) \qquad \text{Equation 8}$$

$$p_{2new} = p_{center} + \left(\frac{w_{new}}{2}, \frac{h_{new}}{2}, 0\right) \qquad \text{Equation 9}$$

The processor 150 may project each of the center position $p_{center}$, the left-top point $p_{1new}$, and the right-bottom point $p_{2new}$ of the new $bbox_{new}$ onto a 2D image. The processor

150 may update state information of the object to bbox$_{new}$= [x$_{new}$, y$_{new}$, w, h] projected onto the 2D image.

The processor 150 may execute rotation correction of all objects which are included in the image 400. When the rotation correction of all the objects is completed, the processor 150 may execute existing 2D object tracking.

Figure 5:
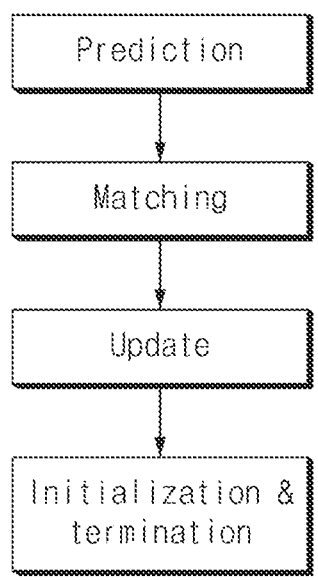
FIG. 5 is a drawing illustrating an example of an object tracking process according to embodiments of the present disclosure.

FIG. 5 is a drawing illustrating an example of an object tracking process according to embodiments of the present disclosure.

In the present embodiment, an example of using a Kalman filter will be described. The Kalman filter may represent a state of each object as mean and variance. The object tracking process using the Kalman filter may be implemented with a prediction step, a matching step, an update step, and an initialization and termination step.

In the prediction step, an object state (a state mean and a state variance) on a new frame may be predicted based on motion information. In other words, a processor 150 of FIG. 1 may predict a state mean of the object at time t based on a measurement value at time t−1. The processor 150 may correct the predicted state mean using a first correction algorithm or a second correction algorithm and may output the corrected state mean. The processor 150 may predict (estimate) a state variance at time t based on a measurement value at time t−1.

In the matching step, matching between the predicted object state and a state of an object being tracked may be performed. The processor 150 may calculate intersection over union (IoU) or Euclidean distance between the detected objects and objects being tracked and may perform matching between two objects using a Hungarian algorithm or a greedy algorithm based on the calculated value.

In the correction step, a difference between the predicted object state and the matched object state may be calculated. The processor 150 may reflect the calculated difference and a Kalman gain in the predicted state mean at time t to update the state mean at time t. Furthermore, the processor 150 may update the state variance at time t.

In the final step, when the matched object is not found, the detected object is initialized to a new object and tracking of the object being tracked may be ended.

Figure 6:
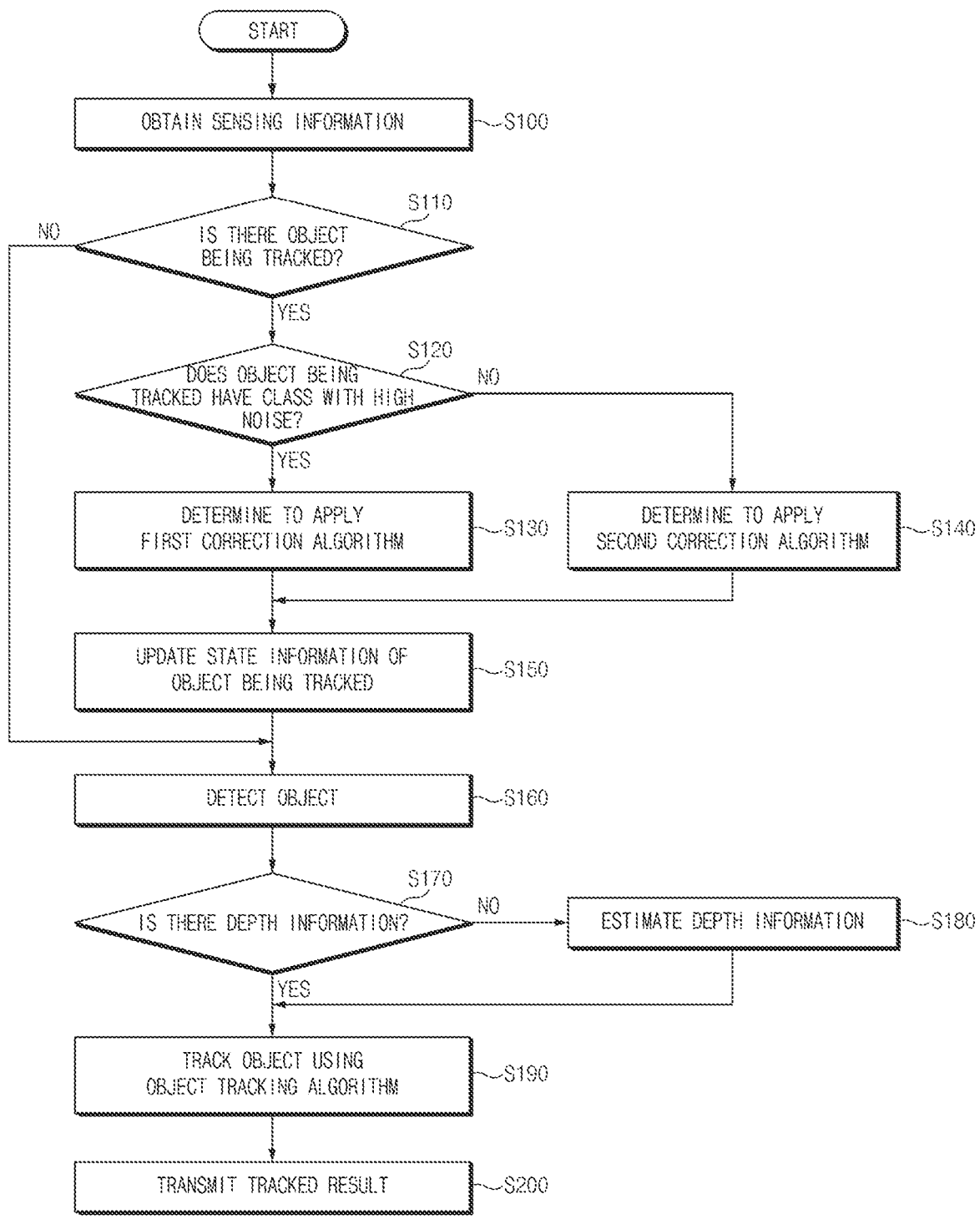
FIG. 6 is a flowchart illustrating a method for tracking an object in an electronic device according to embodiments of the present disclosure.

FIG. 6 is a flowchart illustrating a method for tracking an object in an electronic device according to embodiments of the present disclosure.

In S100, a processor 150 of FIG. 1 may obtain sensing information. The sensing information may include an image, depth information, and/or rotation information. The processor 150 may obtain (acquire) an image and depth information from a camera 110 of FIG. 1. The processor 150 may obtain rotation information of the camera 110 from a detector 120 of FIG. 1.

In S110, the processor 150 may identify whether there is an object (a first object) being tracked. The processor 150 may perform an operation after S120, when there is the object being tracked, and may perform an operation before S160, when there is no object being tracked.

In S120, the processor 150 may identify whether the object being tracked has a class with high noise. The processor 150 may identify whether the object being tracked has the class with the high noise with reference to a lookup table stored in a memory 130 of FIG. 1.

When the object being tracked has the class with the high noise, in S130, the processor 150 may determine to apply a first correction algorithm. The first correction algorithm may correct state information of the object using a center position of an object bounding box bbox. The state information may include center coordinates, a width, and a height of the bounding box.

When the object being tracked does not have the class with the high noise, in S140, the processor 150 may determine to apply a second correction algorithm. When the object being tracked has a class with low noise, the processor 150 may determine to apply the second correction algorithm. The second correction algorithm may correct state information of the object using three points of the object bounding box bbox.

In S150, the processor 150 may update (correct) state information of the object being tracked, using the determined correction algorithm. The processor 150 may attenuate an influence by camera rotation from previous state information of the object being tracked using rotation information.

In S160, the processor 150 may detect an object (a second object) from the image obtained from the camera 110. When there is an object being tracked on the image, the processor 150 may detect a portion of the object being tracked and/or a new object. Furthermore, when there is no object being tracked, the processor 150 may detect all objects in the image as new objects.

In S170, the processor 150 may identify whether there is depth information about the detected object.

When there is no depth information about the detected object, in S180, the processor 150 may estimate depth information. The processor 150 may calculate depth information of the object according to a size of the detected object bounding box based on prior information (e.g., an average size or the like).

In S190, the processor 150 may track an object using an object tracking algorithm based on the depth information. The processor 150 may determine a change in state information of the detected object (the second object) matched with the object (the first object) being tracked based on the corrected state information of the object being tracked.

In S200, the processor 150 may transmit the result of tracking the object to the outside. The processor 150 may transmit the result of tracking the object to an external system using a communicator 140 of FIG. 1. The external system may provide a predetermined specific service using the result of tracking the object.

Figure 7:
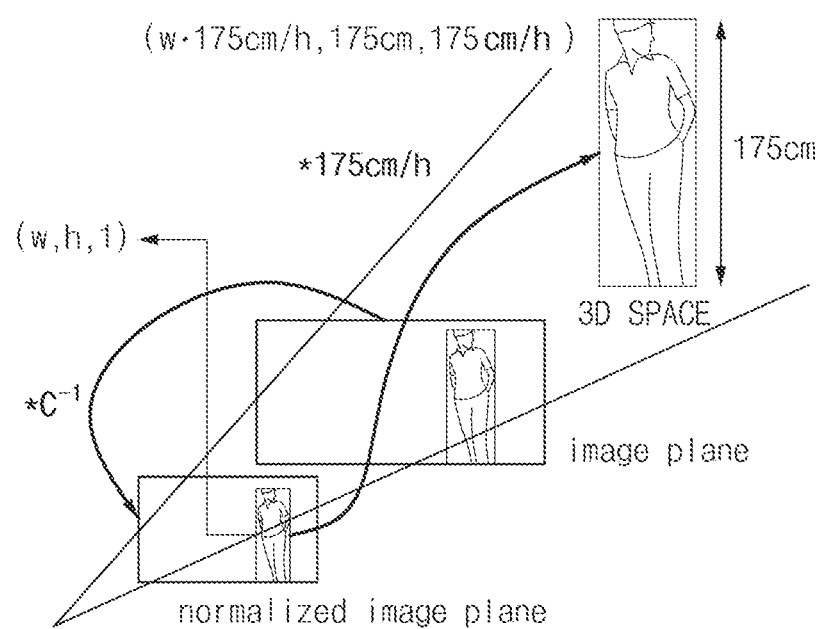
FIG. 7 is a drawing illustrating a method for estimating depth information according to embodiments of the present disclosure.

FIG. 7 is a drawing illustrating a method for estimating depth information according to embodiments of the present disclosure.

Estimation of the depth information is possible, although there is no depth sensor. A depth of an object detected from an image may be calculated according to a size (a bbox size) of the object based on prior information about the object, for example, an average size of an adult face, an average height of an adult, and/or the like.

Figure 8A:
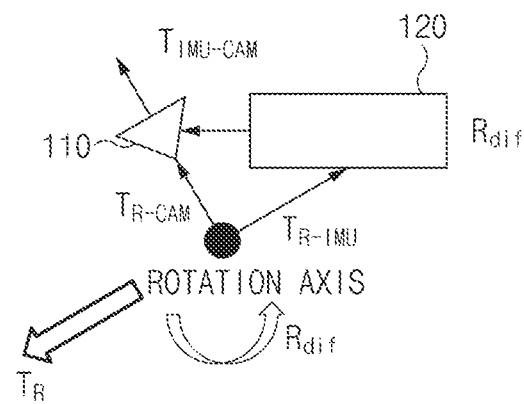
FIGS. 8A and 8B are drawings illustrating a correction method with regard to linear motion of a camera according to another embodiment of the present disclosure.
Figure 8B:
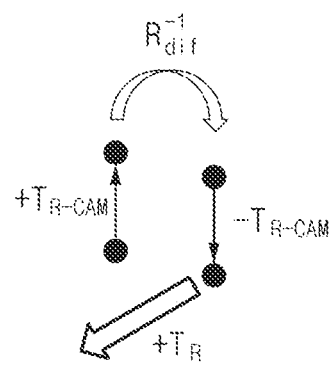

FIGS. 8A and 8B are drawings illustrating a correction method with regard to linear motion of a camera according to another embodiment of the present disclosure.

As shown in FIG. 8A, a camera 110 may have linear motion T$_R$ on x-, y-, and/or z-axis other than motion which rotates with respect to a specific axis. In this case, a processor 150 of FIG. 1 may obtain horizontal translation information together other than rotation information of the camera 110 using feature matching or an additional sensor.

The processor 150 may reflect information T$_R$ about linear motion other than rotation information in Equation 3 above to represent it as Equation 10 below.

$$P_{3dnew} = R_{dif}^{-1} \cdot (P_{3d} + T_{R-cam}) - T_{R-cam} + T_R \quad \text{Equation 10:}$$

Correction for linear motion may be performed before or after a Kalman filter prediction step. A filter used for object tracking, matching metric (e.g., IoU, Euclidean distance, or the like), a data association algorithm (e.g., a Hungarian algorithm, a greedy algorithm, or the like) may be changed.

In the above-mentioned embodiments, an example of performing the motion modeling using the Kalman filter is described, but not limited thereto. An extended Kalman filter (EKF), a particle filter, a linear motion model, or the like may be used.

Figure 9:
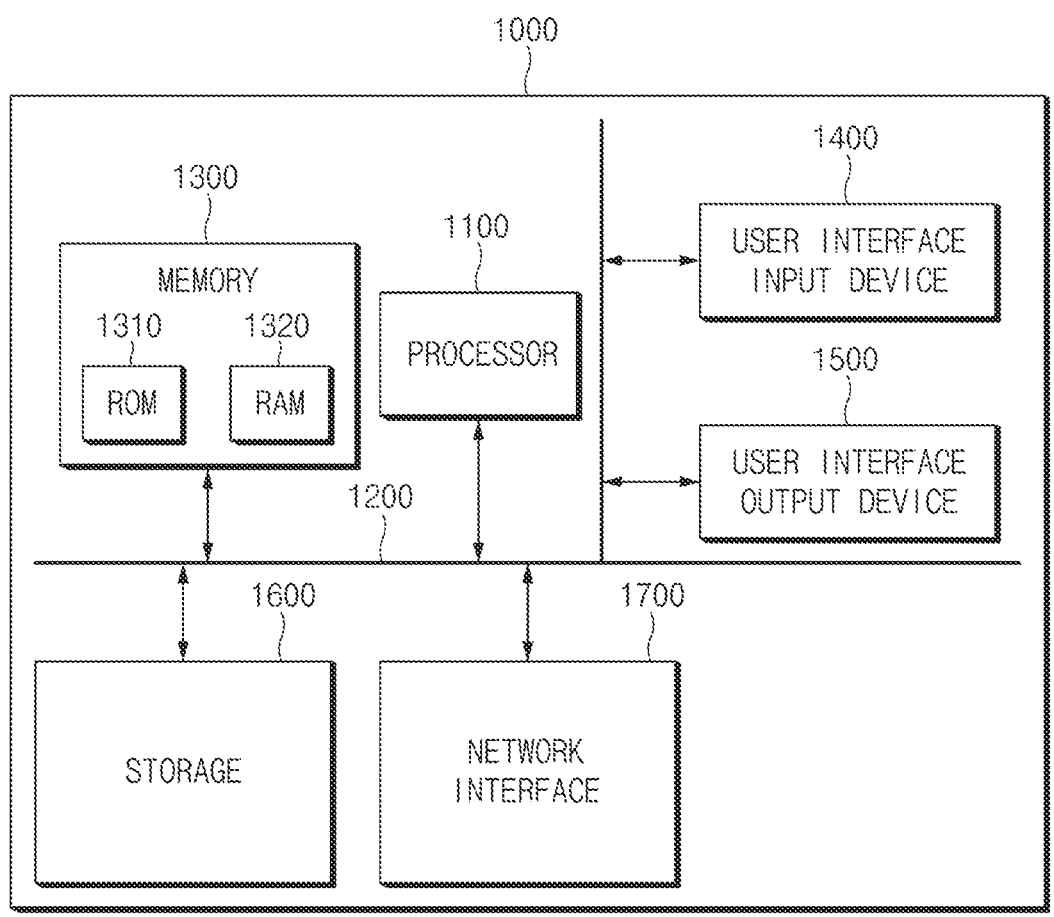
FIG. 9 is a block diagram illustrating a computing system for executing a method tracking an object according to embodiments of the present disclosure.

FIG. 9 is a block diagram illustrating a computing system for executing a method tracking an object according to embodiments of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the electronic device may attenuate an influence according to rotation of the camera using rotation information of the camera and may accurately model only motion of the object, thus accurately tracking the object in a situation where the camera moves.

Furthermore, according to embodiments of the present disclosure, the electronic device may quickly operate in an embedded environment, because computational burden is less than an existing technique such as feature matching.

Furthermore, according to embodiments of the present disclosure, the electronic device may provide high correction reliability as a rotation error is not accumulated, because of using a rotation matrix difference value between two frames.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. The scope of the present disclosure should be construed based on the accompanying claims, and all the technical ideas within the scope equivalent to the claims should be included in the scope of the present disclosure. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

The invention claimed is:

1. A method for tracking an object in an electronic device, the method comprising;
   identifying, by a processor, whether there is a first object being tracked when obtaining an image and rotation information of a camera of the electronic device;
   correcting state information of the first object using the rotation information, when there is the first object being tracked;
   detecting a second object matched to the first object from the image based on the corrected state information; and
   tracking the second object using an object tracking algorithm.

2. The method of claim 1, wherein the correcting of the state information of the first object includes:
   identifying whether the first object has a class with high noise with reference to a lookup table;
   determining whether to apply a first correction algorithm, when the first object has the class with the high noise; and
   determining whether to apply a second correction algorithm, when the first object does not have the class with the high noise.

3. The method of claim 2, wherein the correcting of the state information of the first object includes:
   calculating a difference value between a previous rotation matrix and a current rotation matrix of the camera;
   projecting a center point of the first object onto a three-dimensional (3D) space using a calibration matrix and previous depth information;
   performing rotation correction of the center point of the first object projected onto the 3D space based on the calculated difference value;
   projecting the rotation corrected center point of the first object onto a two-dimensional (2D) image using the calibration matrix and current depth information; and
   updating previous state information of the first object to state information of the first object projected onto the 2D image.

4. The method of claim 2, wherein the correcting of the state information of the first object includes:
   calculating a difference value between a previous rotation matrix and a current rotation matrix of the camera;
   projecting each of three points of a bounding box of the first object onto a 3D space using a calibration matrix and previous depth information;
   performing rotation correction of each of the three points projected onto the 3D space based on the calculated difference value;
   projecting each of the rotation corrected three points onto a 2D image using the calibration matrix and current depth information; and
   updating state information of the first object based on a bounding box projected onto the 2D image.

5. The method of claim 1, wherein the state information includes center point coordinates, a width, and a height of an object bounding box.

6. The method of claim 1, wherein the object tracking algorithm is at least one of a Kalman filter, an extended Kalman filter, a particle filter, or a linear motion model.

7. The method of claim 1, wherein the identifying of whether there is the first object includes:
receiving the image and depth information from the camera; and
receiving the rotation information of the camera from a detector of the electronic device.

8. The method of claim 1, wherein the detecting of the second object matched to the first object includes:
calculating intersection over union (IoU) or Euclidean distance between the first object and the second object; and
performing matching between the first object and the second object using a data association algorithm based on the calculated IoU or the calculated Euclidean distance.

9. The method of claim 8, wherein the detecting of the second object matched to the first object further includes:
ending tracking of the first object and determining the second object as a new object, when there is no the second object matched to the first object.

10. The method of claim 1, wherein the tracking of the second object includes:
estimating depth information using prior information about a size of the second object, when there is no depth information; and
tracking the second object based on the estimated depth information.

11. An electronic device, comprising:
a camera configured to obtain an image;
a detector configured to detect rotation information of the camera; and
a processor connected with the camera and the detector, wherein the processor is configured to:
identify whether there is a first object being tracked when obtaining the image and the rotation information of the camera;
correct state information of the first object using the rotation information when there is the first object;
detect a second object matched to the first object from the image based on the corrected state information; and
track a position of the second object using an object tracking algorithm.

12. The electronic device of claim 11, wherein the processor is further configured to:
identify whether the first object has a class with high noise with reference to a lookup;
determine to apply a first correction algorithm when the first object has the class with the high noise; and
determine to apply a second correction algorithm, when the first object does not have the class with the high noise.

13. The electronic device of claim 12, wherein the processor is further configured to:
calculate a difference value between a previous rotation matrix and a current rotation matrix of the camera;
project a center point of the first object onto a three-dimensional (3D) space using a calibration matrix and previous depth;
perform rotation correction of the center point of the first object projected onto the 3D space based on the calculated difference value;
project the rotation corrected center point of the first object onto a two-dimensional (2D) image using the calibration matrix and current depth information; and
update previous state information of the first object to state information of the first object projected onto the 2D image.

14. The electronic device of claim 12, wherein the processor is further configured to:
calculate a difference value between a previous rotation matrix and a current rotation matrix of the camera;
project each of three points of a bounding box of the first object onto a 3D space using a calibration matrix and previous depth information;
perform rotation correction of each of the three points projected onto the 3D space based on the calculated difference value;
project each of the rotation corrected three points onto a 2D image using the calibration matrix and current depth information; and
update state information of the first object based on a bounding box projected onto the 2D image.

15. The electronic device of claim 11, wherein the state information includes center point coordinates, a width, and a height of an object bounding box.

16. The electronic device of claim 11, wherein the object tracking algorithm is at least one of a Kalman filter, an extended Kalman filter, a particle filter, or a linear motion model.

17. The electronic device of claim 11, wherein the processor receives the rotation information from a rotation controller configured to control a rotation operation of the camera.

18. The electronic device of claim 11, wherein the processor is further configured to:
calculate intersection over union (IoU) or Euclidean distance between the first object and the second object; and
perform matching between the first object and the second object using a data association algorithm based on the calculated IoU or the calculated Euclidean distance.

19. The electronic device of claim 11, wherein the processor ends tracking of the first object and determines the second object as a new object when there is no the second object matched to the first object.

20. The electronic device of claim 11, wherein the processor estimates depth information using prior information about a size of the second object when there is no depth information and tracks the second object based on the estimated depth information.

* * * * *